Patented Nov. 13, 1928.

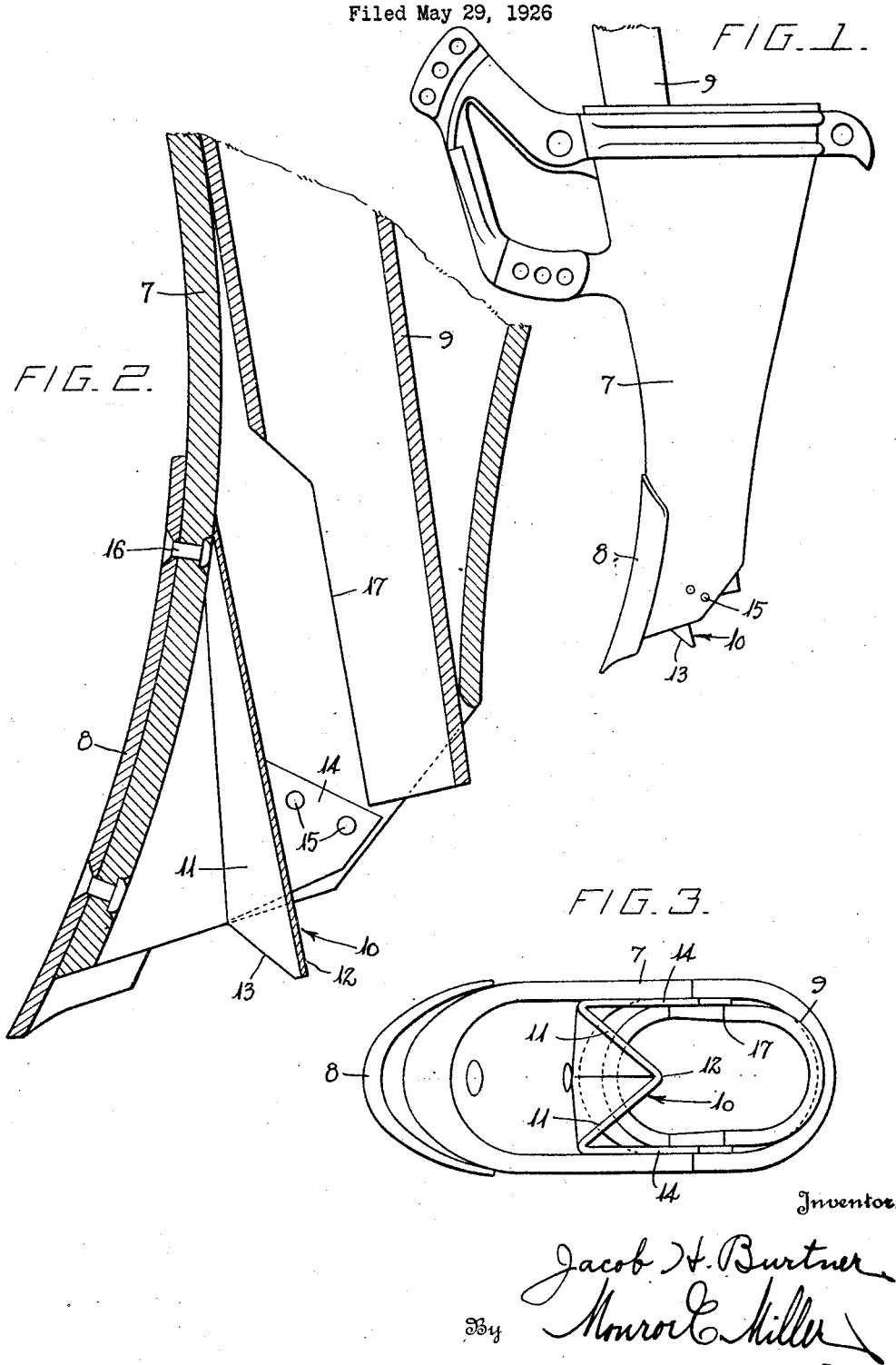

1,691,466

UNITED STATES PATENT OFFICE.

JACOB HARP BURTNER, OF BOONSBORO, MARYLAND.

GRAIN DRILL.

Application filed May 29, 1926. Serial No. 112,547.

The present invention relates to grain drills, and aims to provide a novel and improved grain deflector to be used in the lower end of a drill boot, in order to prevent the grain dropping too close to the shovel and being covered too deep, and also for the purpose of spreading the grains apart to allow more space between the plants.

Another object is the provision of a grain spout cooperable with the grain deflector for directing the grain to the deflector.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of a grain drill embodying the improvements.

Fig. 2 is an enlarged median vertical section of the lower portion of the boot and other parts of the drill.

Fig. 3 is a lower end view of the parts seen in Fig. 2.

The drill boot 7 is of conventional construction, and has secured to the lower end portion thereof at the front, the usual shovel 8. A grain spout 9, constructed of rubber hose or other flexible material, extends downwardly to the boot, and the grain is dropped down through said spout by the seed dropper (not shown) as well known.

The grain deflector 10 is composed of sheet metal, and is located within the lower end portion of the boot behind the shovel 8 and shin of the boot. The deflector 10 is V-shaped in horizontal section and has the sides 11 arranged at an angle with one another and converging rearwardly to a forwardly inclined ridge 12. The upper end of the deflector is formed to fit against the shin or front wall of the boot at a point behind the upper portion of the shovel 8, and the lower end of the deflector projects slightly downwardly below the lower end of the boot. The lower ends of the sides 11 are cut obliquely so as to extend downwardly and rearwardly from the side walls of the boot to the lower end of the ridge 12. Flanges 14 extend from the opposite edges of the sides 11 and are bent rearwardly to bear against the side walls of the boot, and are secured by rivets 15 or other securing elements to said side walls, thereby supporting the deflector in place within the boot. If desired, a single rivet or securing element may be used at each side, and the upper securing rivet 16 of the shovel 8 engaged through the upper portion of the deflector.

The lower terminal of the spout 9 extends to the lower end of the boot, and the front portion of the lower terminal of the spout is cut away, as at 17, to provide a forwardly directed opening confronting the deflector, in order that the seeds dropped through the spout will be directed toward the deflector from the rear, and the spout 9 may be arranged with its lower terminal closer to the deflector, if desired or necessary.

The deflector 10 prevents the grain from dropping too close to the shovel 8, so as to be covered by too much soil, and the loose soil has an opportunity of falling back into the furrow opened by the shovel, so as to provide a seed bed on which the grain drops. The lower portion or nose of the deflector projecting below the boot will assist in smoothing the soil behind the shovel to form the seed bed, and the grains being directed against the deflector will be deflected by the sides 11 of the deflector toward opposite sides. This will spread the grains apart transversely of the row, and will allow greater space between the plants than usual, in order that the plants may have better opportunity for maturing, with an increased crop.

Having thus described the invention, what is claimed as new is:—

1. A deflector for use in the lower end portion of a drill boot composed of sheet metal and V-shaped in horizontal section with its sides converging rearwardly to a ridge, the lower ends of said sides being oblique and extending downwardly and rearwardly to the lower end of said ridge to provide a nose to work in the soil behind a shovel carried by said boot.

2. The combination with a drill boot having a shovel thereon at its lower end, of a deflector within the boot behind said shovel composed of sheet metal and V-shaped in horizontal section with its sides converging rearwardly to a ridge, the lower ends of said sides being oblique and extending downwardly and rearwardly to the lower end of said ridge to provide a nose, and said nose being arranged to work the soil behind said shovel.

3. The combination with a drill boot, of a deflector mounted therein at the lower end of the boot and having rearwardly converging sides with a ridge between them, and a spout extending downwardly in the boot for a distance behind said deflector and open at the front thereof for a vertical distance along said ridge.

In testimony whereof I hereunto affix my signature.

JACOB HARP BURTNER.